United States Patent
Funaki et al.

(10) Patent No.: US 10,478,923 B2
(45) Date of Patent: Nov. 19, 2019

(54) LASER MACHINING DEVICE AND LASER OSCILLATION CONTROL METHOD

(71) Applicant: AMADA COMPANY, LIMITED, Kanagawa-ken (JP)

(72) Inventors: Koji Funaki, Kanagawa (JP); Yoshito Kagiwada, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 60 days.

(21) Appl. No.: 14/372,626

(22) PCT Filed: Jan. 16, 2013

(86) PCT No.: PCT/JP2013/050624
§ 371 (c)(1),
(2) Date: Jul. 16, 2014

(87) PCT Pub. No.: WO2013/108769
PCT Pub. Date: Jul. 25, 2013

(65) Prior Publication Data
US 2015/0021303 A1    Jan. 22, 2015

(30) Foreign Application Priority Data

Jan. 18, 2012 (JP) ................. 2012-008012

(51) Int. Cl.
*B23K 26/30* (2014.01)
*B23K 26/06* (2014.01)
(Continued)

(52) U.S. Cl.
CPC ........ *B23K 26/707* (2015.10); *B23K 26/0626* (2013.01)

(58) Field of Classification Search
CPC ..... B23K 26/00; B23K 26/064; B23K 26/073
(Continued)

(56) References Cited

U.S. PATENT DOCUMENTS

| 4,311,142 A | * | 1/1982 | Machida | ................ A61B 18/20 219/121.62 |
| 4,317,981 A | * | 3/1982 | Chubarov | ................ B23K 9/10 219/121.3 |

(Continued)

FOREIGN PATENT DOCUMENTS

| CN | 101047297 A | 10/2007 |
| DE | 4305313 | 3/1994 |

(Continued)

OTHER PUBLICATIONS

Office Action in Taiwan Patent Application No. 102101767, dated May 12, 2015.

(Continued)

*Primary Examiner* — Ibrahime A Abraham
*Assistant Examiner* — Gyounghyun Bae
(74) *Attorney, Agent, or Firm* — Greenblum & Bernstein, P.L.C.

(57) ABSTRACT

A laser machining device includes a laser oscillator for oscillating a laser beam to have a variable output according to a machining condition, an optical fiber for propagating the laser beam, a sensor for detecting an intensity of a light leaking from a cladding side face of the optical fiber and outputting a detection signal indicating that intensity, and an oscillation control unit for controlling an operation of that laser machining device based on the detection signal. The oscillation control unit compares a first threshold that is set in correspondence to that output with an intensity or an amount of light obtained from the detection signal, compares a second threshold that is set in correspondence to that output with an intensity or an amount of light obtained from the detection signal, and controls the operation of that laser machining device based on a result of comparing.

19 Claims, 7 Drawing Sheets

(51) Int. Cl.
*B23K 26/08* (2014.01)
*B23K 26/70* (2014.01)

(58) Field of Classification Search
USPC .............. 219/121.6, 121.73, 121.83, 121.85
See application file for complete search history.

(56) References Cited

U.S. PATENT DOCUMENTS

| | | | | |
|---|---|---|---|---|
| 4,698,692 A * | 10/1987 | Fry | .................. | G02F 1/113 219/121.67 |
| 4,812,164 A * | 3/1989 | Wenger | ................ | C07D 239/36 504/243 |
| 4,812,641 A * | 3/1989 | Ortiz, Jr. | ................ | G01M 11/35 219/121.62 |
| 4,834,533 A * | 5/1989 | Horike | ................ | G01N 21/431 250/227.23 |
| 4,936,649 A * | 6/1990 | Lymer | ................ | G01M 5/0091 156/158 |
| 4,937,422 A * | 6/1990 | Nagamine | ............ | B23K 26/00 219/121.61 |
| 5,012,087 A * | 4/1991 | Rockstroh | ............ | G01M 11/33 250/227.15 |
| 5,052,776 A * | 10/1991 | Fukushima | ............ | G02B 6/08 250/208.1 |
| 5,159,402 A * | 10/1992 | Ortiz, Jr. | ............ | B23K 26/702 356/237.1 |
| 5,360,960 A * | 11/1994 | Shirk | ................ | B23K 26/032 219/121.63 |
| 5,463,710 A * | 10/1995 | Filgas | ................ | G02B 6/4225 385/44 |
| 5,841,099 A * | 11/1998 | Owen | ................ | C23C 14/046 219/121.69 |
| 6,204,470 B1 * | 3/2001 | Sasaki | ................ | H01S 3/13 219/121.61 |
| 6,218,642 B1 * | 4/2001 | Christmas | ................ | C21D 1/09 219/121.65 |
| 6,355,905 B1 * | 3/2002 | Sasaki | ................ | H01S 3/102 219/121.62 |
| 6,528,761 B1 | 3/2003 | Roos et al. | | |
| 6,924,474 B2 * | 8/2005 | Kato | ................ | G01J 1/18 250/227.11 |
| 6,932,809 B2 * | 8/2005 | Sinofsky | ................ | A61B 18/20 250/336.1 |
| 6,937,329 B2 * | 8/2005 | Esmiller | ................ | B23K 1/0056 219/121.63 |
| 7,020,171 B2 | 3/2006 | Koshimae et al. | | |
| 7,088,437 B2 * | 8/2006 | Blomster | ................ | G01M 11/35 356/73.1 |
| 7,146,073 B2 * | 12/2006 | Wan | ................ | B23K 26/03 385/29 |
| 7,294,280 B2 | 11/2007 | Sherrer et al. | | |
| 7,359,411 B2 | 4/2008 | Matsuda et al. | | |
| 7,371,019 B2 * | 5/2008 | Seifert | ................ | G01M 11/37 385/95 |
| 7,471,712 B2 | 12/2008 | Shida et al. | | |
| 7,630,424 B2 | 12/2009 | Ershov et al. | | |
| 7,643,529 B2 | 1/2010 | Brown et al. | | |
| 7,715,459 B2 | 5/2010 | Brown et al. | | |
| 7,746,913 B2 | 6/2010 | Ershov et al. | | |
| 7,778,302 B2 | 8/2010 | Ershov et al. | | |
| 7,787,504 B2 * | 8/2010 | Leggett | ................ | H01S 5/06825 372/29.02 |
| 7,822,092 B2 | 10/2010 | Ershov et al. | | |
| 7,869,016 B2 * | 1/2011 | Mitchell | ................ | A61B 18/22 356/73.1 |
| 7,920,616 B2 | 4/2011 | Brown et al. | | |
| 7,999,915 B2 | 8/2011 | Ershov et al. | | |
| 8,144,740 B1 | 3/2012 | Brown et al. | | |
| 8,419,293 B2 * | 4/2013 | Zerfas | ................ | G02B 6/4296 385/123 |
| 8,420,977 B2 * | 4/2013 | Bradley | ................ | F41G 7/224 219/121.67 |
| 8,908,735 B2 | 12/2014 | Ershov et al. | | |
| 9,134,171 B2 * | 9/2015 | Blomster | ................ | G01J 1/4257 |
| 2002/0003130 A1 * | 1/2002 | Sun | ................ | B23K 26/04 219/121.68 |
| 2004/0258107 A1 | 12/2004 | Sherrer et al. | | |
| 2005/0077275 A1 * | 4/2005 | Stoltz | ................ | B23K 26/361 219/121.69 |
| 2005/0201430 A1 | 9/2005 | Koshimae et al. | | |
| 2006/0013532 A1 * | 1/2006 | Wan | ................ | B23K 26/03 385/31 |
| 2006/0165343 A1 * | 7/2006 | Seifert | ................ | G01M 11/37 385/12 |
| 2006/0219676 A1 * | 10/2006 | Taylor | ................ | B82Y 20/00 219/121.69 |
| 2007/0158315 A1 * | 7/2007 | Tanaka | ................ | B23K 26/0604 219/121.8 |
| 2007/0230517 A1 | 10/2007 | Matsuda et al. | | |
| 2008/0030823 A1 | 2/2008 | Shida et al. | | |
| 2008/0173392 A1 * | 7/2008 | Tanaka | ................ | B23K 26/0604 156/272.8 |
| 2008/0245778 A1 * | 10/2008 | D'Angelo | .......... | B23K 26/0665 219/121.64 |
| 2008/0285601 A1 | 11/2008 | Sherrer et al. | | |
| 2009/0159579 A1 * | 6/2009 | Nishio | ................ | B23K 26/03 219/121.63 |
| 2009/0296755 A1 | 12/2009 | Brown et al. | | |
| 2009/0296758 A1 | 12/2009 | Brown et al. | | |
| 2009/0302012 A1 * | 12/2009 | Ota | ................ | B23K 26/0626 219/121.64 |
| 2010/0163537 A1 * | 7/2010 | Furuta | ................ | B23K 26/38 219/121.72 |
| 2011/0157593 A1 * | 6/2011 | Miyadera | ............ | G01N 21/553 356/445 |
| 2011/0181929 A1 * | 7/2011 | Matsumoto | ........ | B23K 26/0643 359/15 |
| 2011/0240617 A1 * | 10/2011 | Xu | ................ | B23K 26/00 219/121.72 |
| 2012/0103954 A1 * | 5/2012 | Yilbas | ................ | B23K 26/034 219/121.72 |
| 2013/0170514 A1 | 7/2013 | Sugiyama et al. | | |

FOREIGN PATENT DOCUMENTS

| | | |
|---|---|---|
| EP | 1705762 | 9/2006 |
| JP | 5-277775 A | 10/1993 |
| JP | 2001-066483 | 3/2001 |
| JP | 2002-239771 | 8/2002 |
| JP | 2004-151667 | 5/2004 |
| TW | 541774 B | 7/2003 |
| TW | I275222 B | 3/2007 |
| TW | I303453 B | 11/2008 |
| TW | I324423 B | 5/2010 |

OTHER PUBLICATIONS

Office Action in Chinese Application No. 201380005604.9, with an English language translation, dated Mar. 12, 2015.
International Search Report and Written Opinion in PCT/JP2013/050624, dated Apr. 16, 2013.
Decision to Grant Patent in Japanese Application JP 2012-008012 with English language translation, Jun. 30, 2015.
Extended European Search Report in EP 13738442.6, dated Feb. 23, 2016.

* cited by examiner

LASER MACHINING DEVICE AND LASER OSCILLATION CONTROL METHOD

TECHNICAL FIELD

The present invention relates to a laser machining device and a laser oscillation control method, and in particular, to one that prevents an occurrence of a defect of an optical fiber caused by a retuning light very well, in a laser machining using an optical fiber.

BACKGROUND TECHNIQUE

In a laser machining using an optical fiber, when an irradiated laser beam is reflected by a machining target object and re-entered into a cladding of an optical fiber as a returning light, there is a possibility for burning out a coating layer and the like of an optical fiber. Then, in a case where an amount of light of that returning light is large, there is also a concern for resulting in a melting or a disconnection of an optical fiber itself. For this reason, a technique for detecting a returning light and controlling an operation of a laser oscillator according to its amount of light has been proposed. In the patent document 1, it is described that, in an optical fiber with a triple structure of a core, a cladding and an outer core, a returning light leakage unit for leaking a returning light to an external is provided, a sensor for detecting a leakage light is provided at a position corresponding to a light leakage unit in a vicinity of a side face of the optical fiber, and an oscillation of the laser oscillator is stopped when the sensor detects the leakage light.

PRIOR ART DOCUMENT

Patent Document

Patent Document 1: Japanese Patent Application publication No. 2004-151667

SUMMARY OF THE INVENTION

Problems to be Solved by the Invention

The optical fiber described in the patent document 1 is one with a triple structure, but even in an optical fiber with a common double structure comprising a core and a cladding that is not a triple structure, a part of the light propagating through the core will be leaked to an external from a side face of the cladding, albeit for a small amount. Also, the returning light entered into the cladding will also be leaked to an external from a side face of the cladding. The leakage light from the cladding side face combining these will be referred to as a leaked light for the sake of convenience. The intensity of the cladding leaked light will be increased as the intensity of the light propagating within the optical fiber becomes higher. Therefore, in the case where a returning light is present, the intensity of the light detected by a sensor provided in vicinity of the side face of the optical fiber will be an intensity combining a leakage light due to a laser beam propagating from a laser oscillator side (also referred to as a direct light hereafter) and a leakage light due to a returning light propagating from an optical fiber end portion side.

On the other hand, for the laser machining device using an optical fiber, a trend for realizing a higher output for a laser beam has been progressed considerably, so that it is made possible for a user to make a variable control of an output of a laser beam arbitrarily from a low output to a high output, according to a material to be machined and a content of the machining. Moreover, there is also a laser machining device for automatically selecting an optimal output from machining conditions such as a material of a work, a thickness of a plate, etc., and appropriately adjusting it even during the machining. Also, as a method for evaluating a detection result of a returning light, a method in which a threshold for an intensity of a detected cladding leaked light is set in advance and it is judged as not good (NG) in a case where that threshold is exceeded will be desired most, because a sophisticated computational processing is unnecessary and a device can be configured for a general purpose inexpensively.

However, in the case where an output of a laser beam is changed, the intensity of the cladding leaked light detected by a sensor will be changed regardless of a presence or absence or a level of a returning light, so that it becomes difficult to make a judgment as to whether a returning light that exerts an adverse effect to the optical fiber is occurring or not in good precision.

Figure 1:
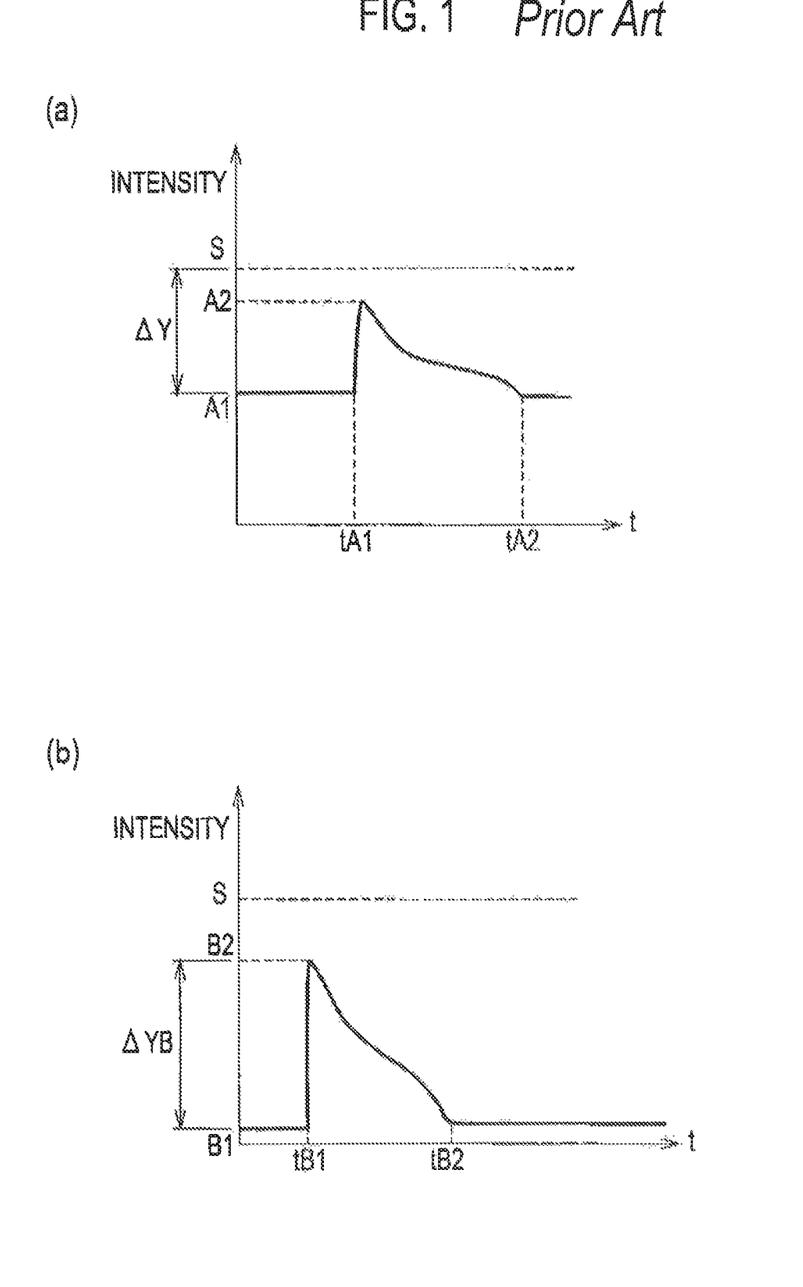
FIG. 1 is a diagram for explaining a prior art.

This will be explained concretely with reference to FIG. 1. FIG. 1($a$) is an exemplary output waveform of a sensor at a time of a high output, in a laser machining device of a variable output type, and FIG. 1($b$) is an exemplary output waveform of a sensor at a time of a low output. A vertical axis is an intensity of the detected cladding leaked light, and a horizontal axis is a time. In each figure, the intensities A1, B1 are values according to the direct light, and a portion with intensities A1-A2 (tA1-tA2) and a portion with intensities B1-B2 (tB1-tB2) are portions according to the returning light.

A case of judging the presence or absence of the returning light that has a possibility of causing a defect in the optical fiber, from the intensity of the cladding leaked light, for example, will be considered. First, suppose that an intensity level of the returning light that may cause a defect is set as $\Delta Y$, and a detection threshold is set as S with $\Delta Y=S-A1$ by applying it to a time of a high output [see FIG. 1($a$)]. Then, if the returning light that was generated with an intensity level $\Delta YB$ such that $\Delta YB=B2-B1<S-B1$ and $\Delta Y<\Delta YB$ at a time of a low output [see FIG. 1($b$)] is generated at a time of a high output, the threshold S is exceeded and it is judged as NG. Conversely, if the returning light with that intensity level $\Delta YB$ is generated at a low output, the threshold S is not exceeded because of the above noted size relationship, and it is not judged as NG. As such, there arises a problem that there can be a case where it is judged as NG and a case where it is not judged as NG, even for the same intensity level of the returning light.

As can be seen from this example, in the case of the variable output type, there is a problem that it is not easy to carry out a detection of the returning light that may cause a defect in high precision, and it is difficult to prevent an occurrence of a defect caused by a returning light very well.

For this reason, the problem to be solved by the present invention is to provide a laser machining device and a laser oscillation control method capable of preventing an occurrence of a defect caused by a returning light very well.

Means for Solving Problems

In order to solve the above noted problems, the present invention has the following configuration and procedure.

(1) In a laser machining device, it is a laser machining device, characterized by having a laser oscillator for oscillating a laser beam to have a variable output according to a machining condition, an optical fiber for propagating said laser beam, a sensor for detecting an intensity of a light leaking from a cladding side face of said optical fiber and outputting a detection signal indicating that intensity, and an oscillation control unit for controlling an operation of that laser machining device based on said detection signal (SN1), wherein said oscillation control unit compares a first threshold that is set in correspondence to that output with an intensity or an amount of light obtained from said detection signal, in a case where an output of said laser oscillator is less than or equal to a prescribed output, compares a second threshold that is set in correspondence to that output with an intensity or an amount of light obtained from said detection signal, in a case where an output of said laser oscillator is greater than said prescribed output, and controls the operation of that laser machining device based on a result of said comparing.

(2) It is a laser oscillation control method mounted on a fiber laser machining device, for controlling an operation of a laser oscillator capable of oscillating a laser beam to have a variable output according to a machining condition, the laser oscillation control method characterized by including a detection step for detecting an intensity of a leakage light leaking from a cladding side face of an optical fiber through which said laser beam is propagating, with a sensor, and obtaining a detection signal indicating said intensity, a comparison step for obtaining an intensity or an amount of light from said detection signal, and comparing said intensity or amount of light obtained, with a threshold that is set in advance and a control step for controlling an operation of said laser oscillator according to a comparison result at said comparison step, wherein said threshold is set to be a different value in correspondence to each of a plurality of outputs of said laser oscillator, said comparison step compares said threshold in correspondence to an output that is being oscillated by said laser oscillator, with said intensity or amount of light, and said control step stops a laser oscillation of said laser oscillator, increases an output of said laser beam oscillated by said laser oscillator, or decelerates a relative moving speed of a work on which said laser beam is irradiated, in a case where said intensity or amount of light exceeds said threshold in a comparison result of said comparison step.

EMBODIMENTS FOR IMPLEMENTING THE INVENTION

The embodiment of the present invention will be described by way of an exemplary embodiment using FIG. 2 to FIG. 9.

Figure 2:
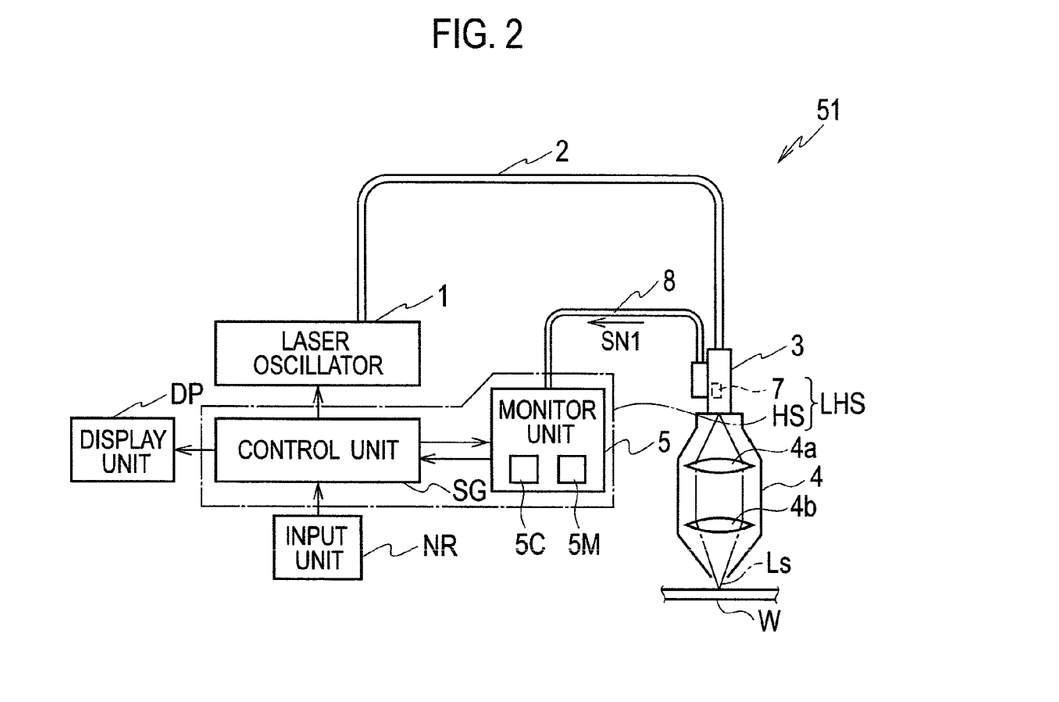
FIG. 2 is a diagram showing a configuration of an embodiment of a laser machining device of the present invention.
Figure 3:
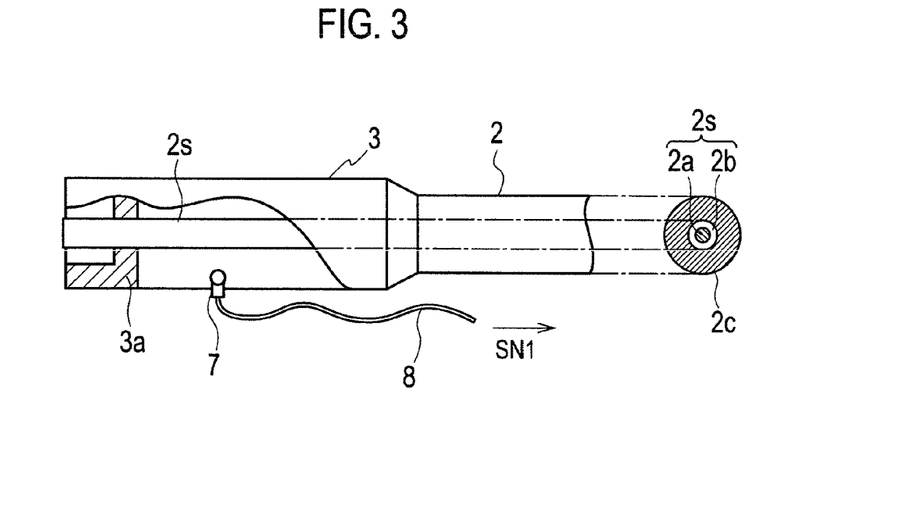
FIG. 3 is a partial cross sectional view for explaining a connector in an embodiment of a laser machining device of the present invention.

First, using FIG. 2 and FIG. 3, a configuration of a laser machining device 51 of an exemplary embodiment will be described.

The laser machining device 51 is a so called fiber laser machining device, and has a laser oscillator 1, an optical fiber 2 for propagating a laser beam oscillated from the laser oscillator 1, a connector unit 3 provided at a tip end portion of the optical fiber 2, a head unit 4 connected to said connector unit 3, for irradiating the laser beam with respect to a work W which is a material to be machined, a control unit SG for controlling an entire device including an operation of the laser oscillator 1, a monitor unit 5 for receiving an output signal from the connector unit 3 and carrying out signal exchanges with the control unit SG, a display (output) unit DP having a speaker device, an image display device and the like for outputting information to an external, and an input unit NR for a user to input information and the like.

Also, an oscillation control unit HS for controlling an operation of the laser oscillator 1 is configured by including the monitor unit 5 and the control unit SG.

The work W and the head unit 4 for irradiating the laser beam on the work W are made to be moved relatively by a driving device not shown in the figure.

The fiber 2 is configured from a wire 2s with a double structure comprising a core 2a of a core portion and a cladding 2b on an outer side of that, and a covering layer 2c for covering the wire 2s. Also, on a surface of the wire 2s, a silicon coating is applied, and the covering layer 2c is provided to cover that coating.

The head unit 4 has a collimator lens 4a for making the laser beam propagated by the fiber 2 to be a parallel light beam, a condenser lens 4b for condensing the laser beam onto the work W, etc., and emits the laser beam Ls from a tip end portion.

The connector unit 3 has a casing 3a for supporting the wire 2s of the fiber 2 on a central axis line, a sensor 7 arranged to be proximate and facing with respect to a side fare of the wire 2c (a side face of the cladding 2b), and a cable 8 for transmitting an output from the sensor 7. The sensor 7 is a photoelectric sensor, for example.

The sensor 7 outputs a detection signal SN1 according to a detected intensity of the light, and this detection signal SN1 is inputted into the monitor unit 5 via the cable 8.

The monitor unit 5 is equipped with a memory unit 5M for storing information (a detail of which will be described later) on a reference level intensity, a threshold, etc., for each output mode, and a CPU 5C for carrying out computations, etc., based on these information.

Here, a laser oscillation control unit LHS is configured by the oscillation control unit HS and the sensor 7.

This laser machining device 51 is made to be capable of setting a laser output arbitrarily from a low level to a highest level. Then, when a desired laser output is inputted from the input unit NR by the user, the control unit SG controls the laser oscillator 1 to output the laser beam at the inputted laser output.

Here, for the sake of simplicity, the output of the laser machining device 51 will be described separately for two step outputs including a high output mode HM with an output higher than a prescribed output, and a low output mode LM with an output lower than a prescribed output. The output setting is, as one example, such that the high output mode HM is set to be 4 kW and the low output mode LM is set to be an output of less than 1 kW, in the case where the maximum output is 4 kW.

In the above described configuration, the laser machining device 51 is made such that the sensor 7 detects a cladding leaked light based on the laser beam (direct light) propagated within the optical fiber 2 from the laser oscillator 1, at a time of carrying out a machining by oscillating the laser beam at a prescribed output.

Figure 4:
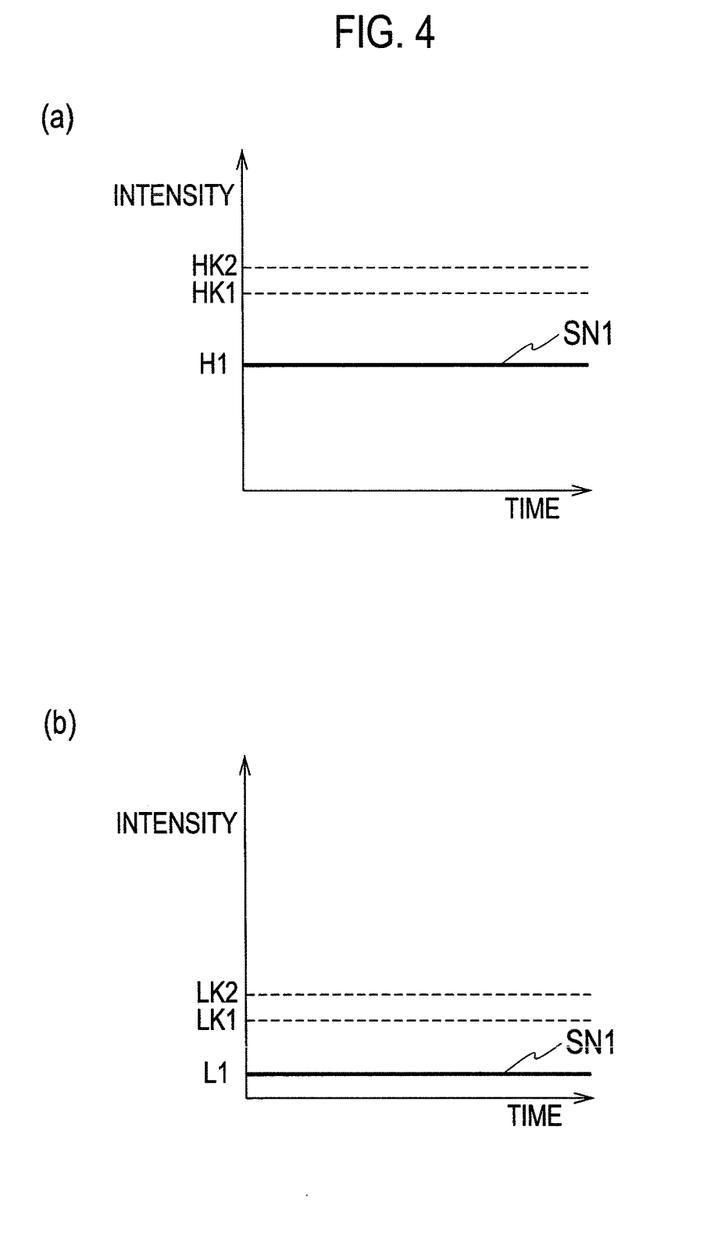
FIG. 4 is a diagram for explaining a leakage light for each laser output level in case of a direct light in an embodiment of a laser machining device of the present invention.

FIGS. 4(*a*) and 4(*b*) are diagrams showing the detection signal SN1 in the case where the cladding leaked light based solely on the direct light is detected by the sensor 7, in a state where there is no returning light. The case of the high output mode HM is shown in FIG. 4(*a*), and the case of the low output mode LM is shown in FIG. 4(*b*).

It can be seen that, in FIG. 4(*a*), with an intensity H1 that is to become a reference level in the high output mode HM is obtained, and in FIG. 4(*b*), an intensity L1 that is to become a reference level in the low output mode LM is obtained. A size relationship of the intensities is L1<H1. The information about the intensity H1, L1 of the reference level in each mode is stored in advance in the memory unit 5M.

Here, the threshold HK, LK in each mode HM, LM is set in advance by a value obtained by multiplying a prescribed magnification a to the reference level. That is, $HK=\alpha \times H1, LK=\alpha \times L1.$ These thresholds HK, LK are stored as threshold information in the memory unit 5M provided at the monitor unit 5.

Also, in each mode HM, LM, a plurality of thresholds may be set. Here, as shown in FIG. 4, alert thresholds HK1, LK1 for alerting attention are set with a magnification α1, and warning thresholds HK2, LK2 for warning are set with a magnification α2. That is, the thresholds in two stages are set. The size relationship of the intensities is HK1<HK2, LK1<LK2.

Moreover, a different magnification may be used for each mode HM, LM, in a sense of a correction in the case where the output characteristic of the sensor is not linear with respect to the detected intensity of the light and the like. That is, it may be set such that $HK1=\alpha 1 \times H1, HK2=\alpha 2 \times H1 (\alpha 1 < \alpha 2)$ $LK1=\beta 1 \times L1, LK2=\kappa 2 \times H1 (\beta 1 < \beta 2).$ One example of the magnification setting is α1=1.3, α2=1.6, α1=β1, α2=β2.

Next, the operation in the case where the returning light has occurred will be described with references to FIG. 5 and FIG. 6. Here, as a representative case, a case of the high output mode HM will be described. A case of the low output mode LM is indicated in parentheses ( ) if it is necessary.

Figure 5:
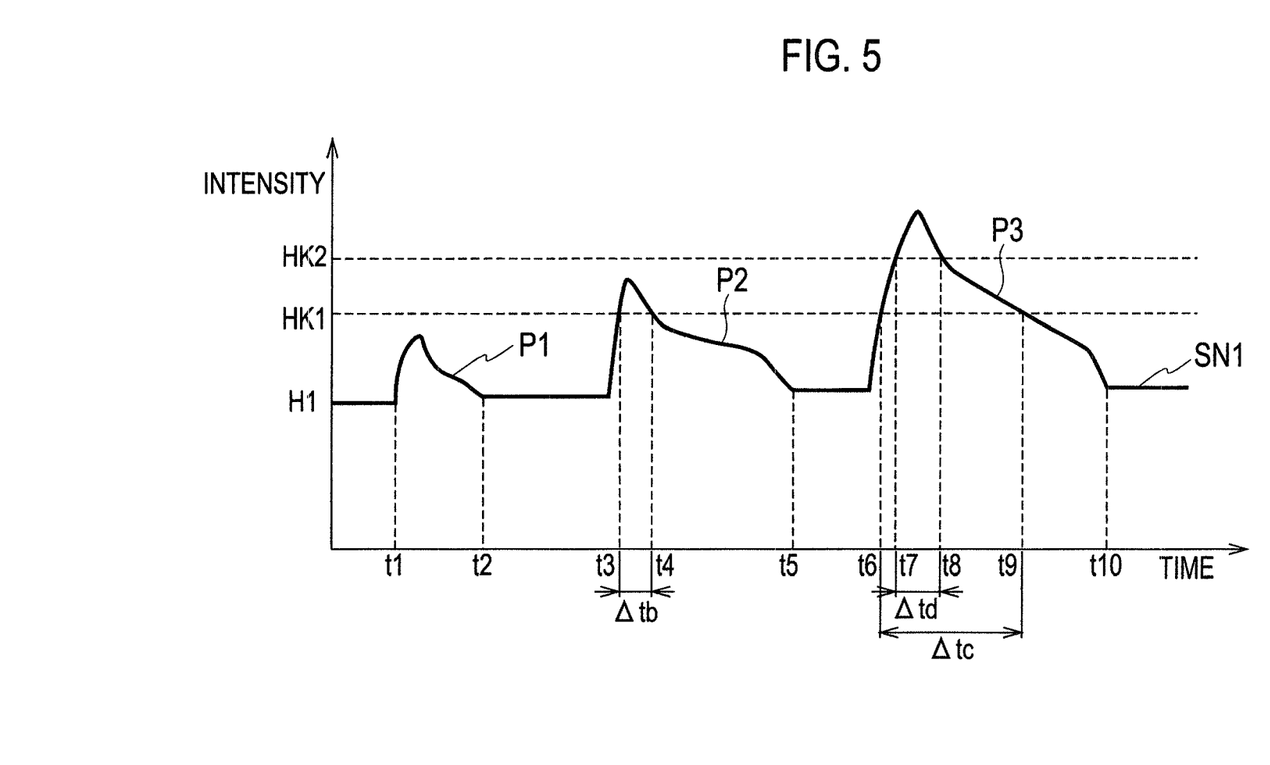
FIG. 5 is a diagram for explaining an intensity of a returning light in an embodiment of a laser machining device of the present invention.
Figure 6:
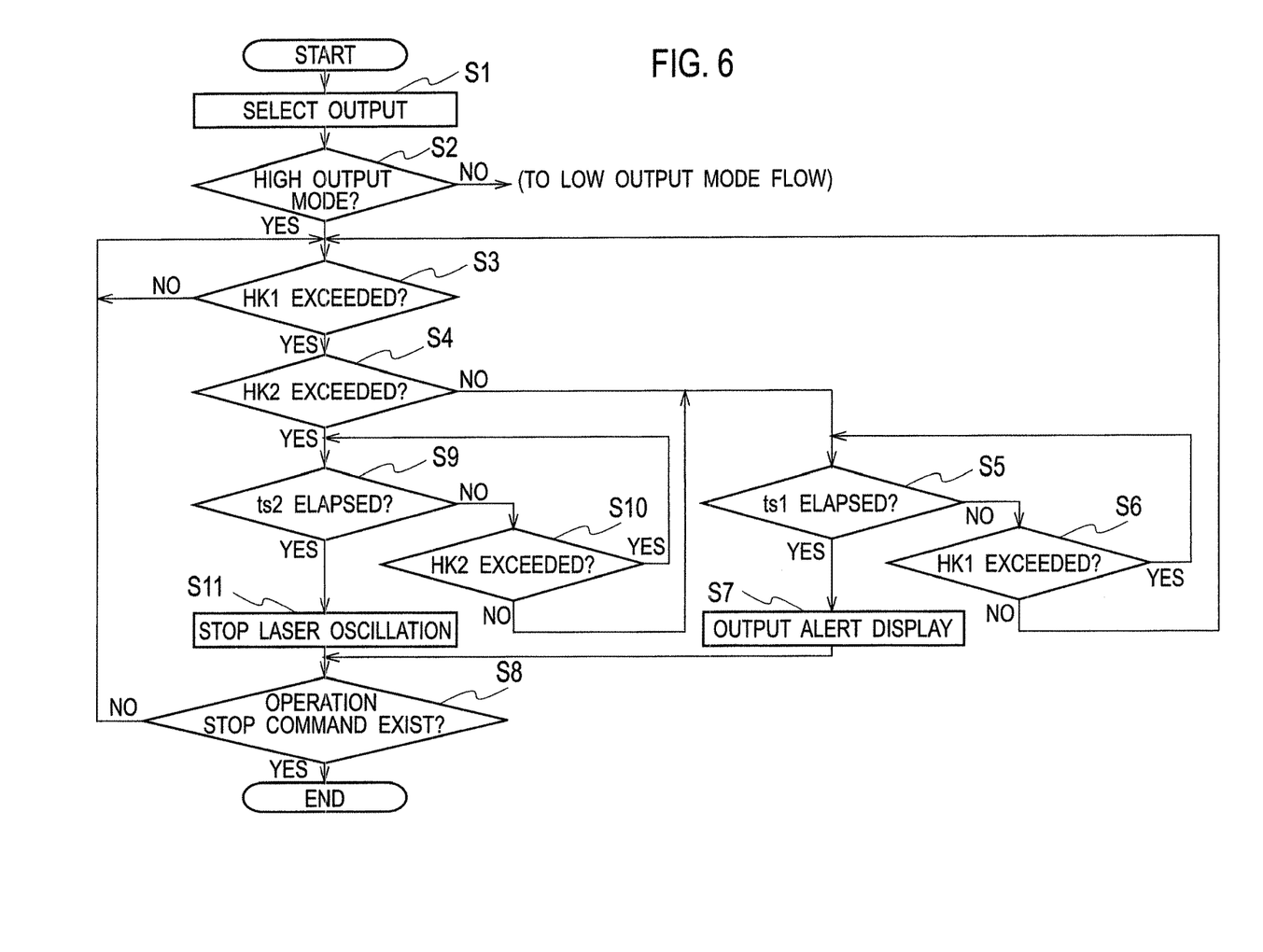
FIG. 6 is a flow diagram for explaining a procedure of an embodiment of a laser oscillation control method of the present invention.

In FIG. 5, three waveforms including a waveform P1 at a time t1-t2, a waveform P2 containing a section of a time t3-t5, and a waveform P3 containing a section of a time t6-t9 are shown as the returning light. To be accurate, the waveform P2 shows a waveform from a timing of rising from an alert threshold HK1 (a timing before a time t3: not shown in the figure) to a timing of falling to an alert threshold HK1 (a timing t5), similarly as the waveform P1. The waveform P3 also shows a waveform from a timing of rising from an alert threshold HK1 (a timing before a time t6: not shown in the figure) to a timing of falling to an alert threshold HK1 (a timing t10), similarly as the waveform P1. FIG. 6 is a flow diagram at a time of the high output mode for the purpose of explaining the judgment of the control unit SG.

As an outline of the operation of the monitor unit 5 and the control unit SG, a predetermined control is executed, in each one of the case where the central processing unit (CPU) 5C of the monitor unit 5 judged that the detection signal SN1 has a portion that exceeds the alert threshold HK1 (LK1) that is set, and the case where the CPU 5C of the monitor unit 5 judged that the detection signal SN1 has a portion that exceeds the warning threshold HK2 (LK2).

For example, in the case where the CPU 5C judged that the alert threshold HK1 (LK1) is exceeded, the control unit SG makes a command with respect to the display unit DP to output a display or a speech for alerting attention to that fact. This corresponds to periods of time t3-t4 and time t6-t9 in FIG. 5. This judgment of the CPU 5C will also be referred to as an alert judgment in the following.

Also, in the case where the warning threshold HK2 (LK2) is exceeded, the control unit SG makes a command with respect to the display unit DP to output a warning display and a warning speech, and makes a command with respect to the laser oscillator 1 to stop the oscillation of the laser beam. This corresponds to a period of time t7-t8 in FIG. 5. This judgment of the CPU 5C will also be referred to as a warning judgment in the following.

The laser oscillator 1 stops the oscillation of the laser beam when this command regarding the warning judgment is received from the control unit SG. In conjunction with this, the returning light will disappear, and it is possible to prevent an occurrence of a defect caused by the returning light such as a burning out of the covering layer of a silicon based material and the like of the optical fiber, a melting or a disconnecting of the optical fiber itself, etc.

Such alert judgment and warning judgment by the CPU 5C are made based on thresholds set for each output mode, so that even if the returning light of a high intensity that may cause a defect or the returning light close to that occurs at a time of the low output mode, for example, it is judged surely and an appropriate processing such as alerting attention or stopping operation is executed.

Also, in an exemplary embodiment, the sensor 7 for detecting the cladding leaked light is arranged at the connector unit 3 close to the head unit 4. In this way, the returning light that is not propagating within the optical fiber 2 can be detected at a position close to its incident source, compared with the case of detecting the returning light at the laser oscillator 1, for example, so that the detection in high precision with little influence of noises is made possible.

Also, at a time of making the alert judgment or the warning judgment, the CPU 5C may be made to monitor a time for which the detection signal SN1 is exceeding the threshold HK1, LK1 or the threshold HK2, LK2, and make the alert judgment or the warning judgment only in the case where it is exceeding for a prescribed time or more.

To be concrete, the alert judgment is made in the case where a time Δtb from time t3 to t4 and a time Δtc from time t6 to t9 shown in FIG. 5 is longer than a prescribed time ts1. Also, the warning judgment is made in the case where a time Δtd from time t7 to t8 is longer than a prescribed time ts2.

Next, using FIG. 6, the operations of the CPU 5C and the control unit SG will be described in detail as a time series.

First, the control unit SG selects a prescribed output within a laser output range based on a machining condition (S1). The control unit SG judges whether the selected mode is a high output mode or not (S2). Here, it is assumed that it is the high output mode HM, and it proceeds to Yes (it proceeds to No in the case where it is the low output mode). The information on the judged output mode is transmitted from the control unit SG to the monitor unit 5. The CPU 5C obtains the information on the threshold and the reference level corresponding to the judged output mode from the memory unit 5M and sets them for numerical values to be used in the computations (not shown in FIG. 6).

The CPU 5C monitors the detection signal SN1 and judges whether it has exceeded the alert threshold HK1 or not (S3). This judgment is evaluated from a difference between the intensity of the detection signal SN1 and the intensity of the reference level. If it is judged as exceeded (Yes), a count of an elapsed time is started, and whether it has exceeded the warning threshold HK2 or not is judged (S4). In the case of No at S4, it is matched with an elapsed time since a timing at which it is judged as Yes at S3, and whether a time ts1 has elapsed since it is judged as Yes at S3 or not is judged (S5).

In the case of No at S5, whether it is exceeding the alert threshold HK1 or not is judged (S6), and it returns to S3 in the case of No, or it returns to S5 in the case of Yes. In the case of Yes at S5, the judgment for executing the attention alerting (the alert judgment) is made, and that judgment result is supplied to the control unit SG. Based on this judgment result, the control unit SG makes a command with respect to the output unit DP to output the display or the speech for alerting attention (S7). Then, whether a command for stopping the operation is present or absent is judged (S8). In the case of Yes at S8, this flow judgment operation is finished, or it returns to S3 in the case of No.

On the other hand, in the case where it is judged as Yes at S4, the count of the elapsed time is started, and whether a time ts2 has elapsed since the start of the count or not is judged (S9). In the case of No at S9, whether it is exceeding the warning threshold HK2 or not is judged (S10). Then, it proceeds to S5 in the case of No at S10, or it returns to S9 in the case of Yes.

In the case of Yes at S9, the CPU 5C makes the warning judgment and supplies that judgment content to the control unit SG. The control unit SG makes a command with respect to the display unit DP to output the warning display and the warning speech, based on that supplied judgment content, while making a command with respect to the laser oscillator 1 to stop the oscillation of the laser beam (S11). Then, whether a command for stopping the operation is present or absent is judged (S8). In the case of Yes at S8, this flow judgment operation is finished, or it returns to S3 in the case of No.

In the case of the low output mode LM, the CPU 5C and the control unit SG execute the similar operations as well. To be concrete, it suffices to replace HK1, HK2 with LK1, LK2, respectively, in FIG. 6.

By the way, the output modes are not limited to those that are set in stages as described above, and may be those that are set steplessly (to be capable of varying continuously).

The thresholds in this case may very well be such that the output level is minutely divided in advance, a threshold if set for each of this divided minute level range, and a table for setting both of them in correspondence is prepared and stored in the memory unit 5M.

Also, the laser machining device may be one that varies the output level during the operation of the laser oscillation such that it becomes optimum for the machining.

In this case, the CPU 5C acquires the corresponding threshold from the table stored in the memory unit 5M according to the output level information that comes in from the control unit SG and changes from time to time, while it is made to replace it as a reference value of the computations whenever necessary.

In this case, the output level information that comes in from the control unit SG can be updated in a short period of time of 125 μsec each, for example, so that for the CPU 5C of the monitor unit 5, one that has a high speed computation capability that can deal with that updating will be adopted.

It goes without saying that the exemplary embodiment of the present invention is not to be limited to the configuration described above, and may be made as a modified example within a range of not departing from the essence of the present invention.

With respect to the monitor unit 5, the output level information supplied from the control unit SG is not to be limited to one that is set, and the output level of the laser beam actually obtained may be detected and it may be one that is based on that detection value.

In the exemplary embodiment, one that detects whether it has exceeded the alert threshold and the warning threshold that are set or not by the intensity of detection signal SN1 has been described, but it may be made such that an amount of light Q is calculated by multiplying the intensity with time, and it is detected based on that amount of light Q, at the CPU 5C. In the actual optical fiber, even when the intensity of the returning light is less than or equal to the threshold that is set, the total amount of light becomes large in the case where the returning light with the intensity close to the threshold continues for a long time, and a possibility for a damage to occur on the optical fiber becomes high.

For this reason, by making the detection based on the amount of light Q, it is possible to carry out the operation of the alerting or the warning with respect to not only the returning light of a pulse like waveform but also the returning light with a gradual waveform durability.

Figure 7:
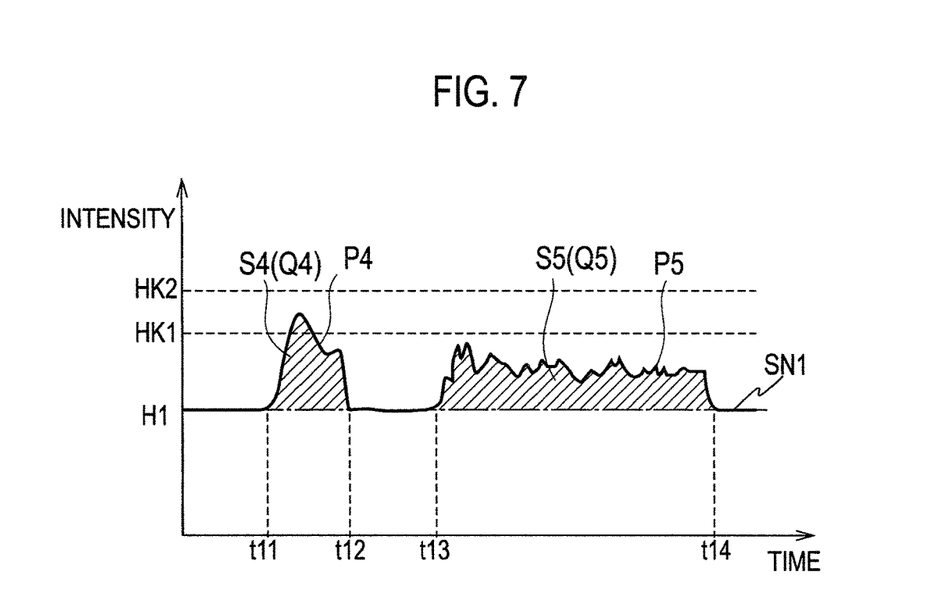
FIG. 7 is a diagram for explaining a modified exampled in an embodiment of a laser oscillation control method of the present invention.

For example, in the figure of the detection signal SN1 shown in FIG. 7, the area S4, S5 of ranges indicated by hatching of t11-t12, t13-t14, respectively in the waveforms P4, P5 (the portions of the waveforms that exceed the reference level H1) are obtained. The area S4, S5 correspond to the amounts of light Q4, Q5 of the returning light. Then, the alert threshold and the warning threshold for the amount of light are set in advance according to the level of influence to the optical fiber, and the alerting and the warning are judged based on these thresholds.

In FIG. 7, the waveform P4 has its portion exceeding the alert threshold HK1, but the waveform P5 is less than or equal to the alert threshold HK1. However, the waveform P5 has a long duration and its amount of light Q5 is larger than the amount of light Q4, so that a level of influence to the optical fiber 2 is going to be large. According to this method for evaluating the amount of light, it is possible to detect the returning light that is going to have a large amount of light without exceeding the threshold for the intensity.

Figure 8:
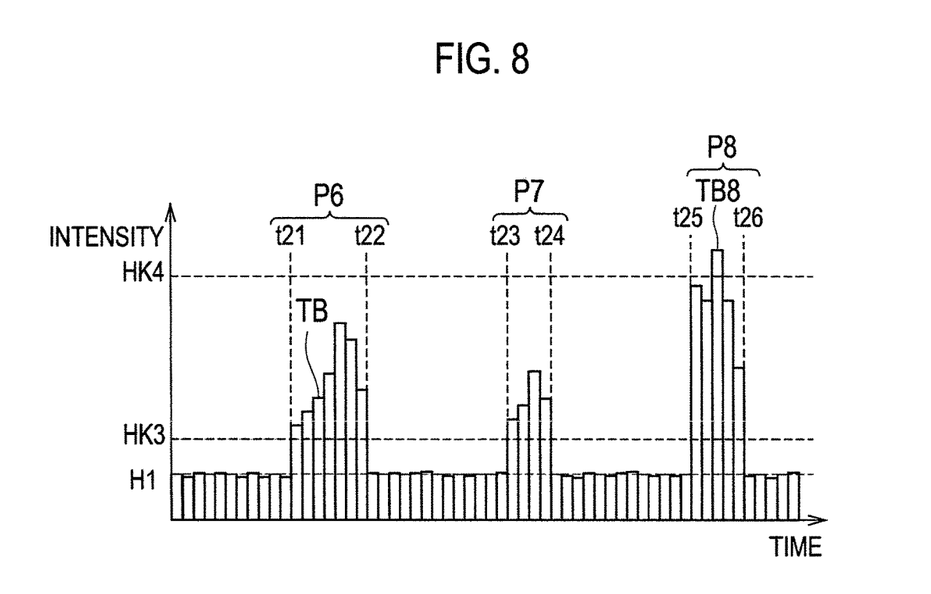
FIG. 8 is a diagram for explaining another modified example in an embodiment of a laser oscillation control method of the present invention.

The evaluation based on the amount of light Q described above will require high speed computations, so that there can be cases where it is difficult to execute in the case of using the general purpose and inexpensive CPU. In that case, as shown in FIG. 8, it may be made such that another threshold HK3 is set in advance for the intensity, the waveform is minutely divided for each prescribed unit time, the number N of the divided portions that exceed the threshold HK3 is obtained, and the alert judgment and the warning judgment are made based on that number N. In the following, one of the divided ones will be referred to as a unit divided portion TB. For example, a threshold Nx is set in advance for the number N of the unit divided portions, and the alert judgment is made in the case where it has exceeded the threshold Nx.

Also, yet another threshold HK4 that is greater than the threshold HK3 is set in advance for the intensity, and the alert judgment or the warning judgment is made even in the case where the number of the unit divided portions does not exceed the threshold Nx, in the case where there is even one unit divided portion that exceeds the threshold HK4, for example.

This will be explained concretely with reference to FIG. 8. In FIG. 8, P6 (t21-t22), P7 (t23-t24) and P8 (t25-t26) are shown as the waveform ranges that exceed the threshold HK3. Here, it is assumed that the threshold Nx is set to be 5, and whether it exceeds to the threshold Nx or not is judged.

The range P6 is exceeding the threshold Nx because there are seven unit divided portions that exceeded the threshold HK3 within a certain time. Therefore, the alert judgment is made. The range P7 has the unit divided portions that exceed the threshold HK3, but its number is four so that it does not exceed the threshold Nx, and there is no unit divided portion that exceeds the threshold HK4, so that the alert judgment and the warning judgment will not be made. The range P8 has five unit divided portions that exceed the threshold HK3 so that it does not exceed the threshold Nx, but one unit divided portion TB8 is exceeding the threshold HK4, so that the warning judgment will be made.

This modified example is capable of making the evaluation of the returning light with a better precision, because the judgment that accounts for time is made rather than the simple evaluation by the intensity alone. Also, the area calculation is not carried out, so that the load on the CPU 5C is relatively less, and it is suitable for the case of using the general purpose and inexpensive CPU.

Figure 9:
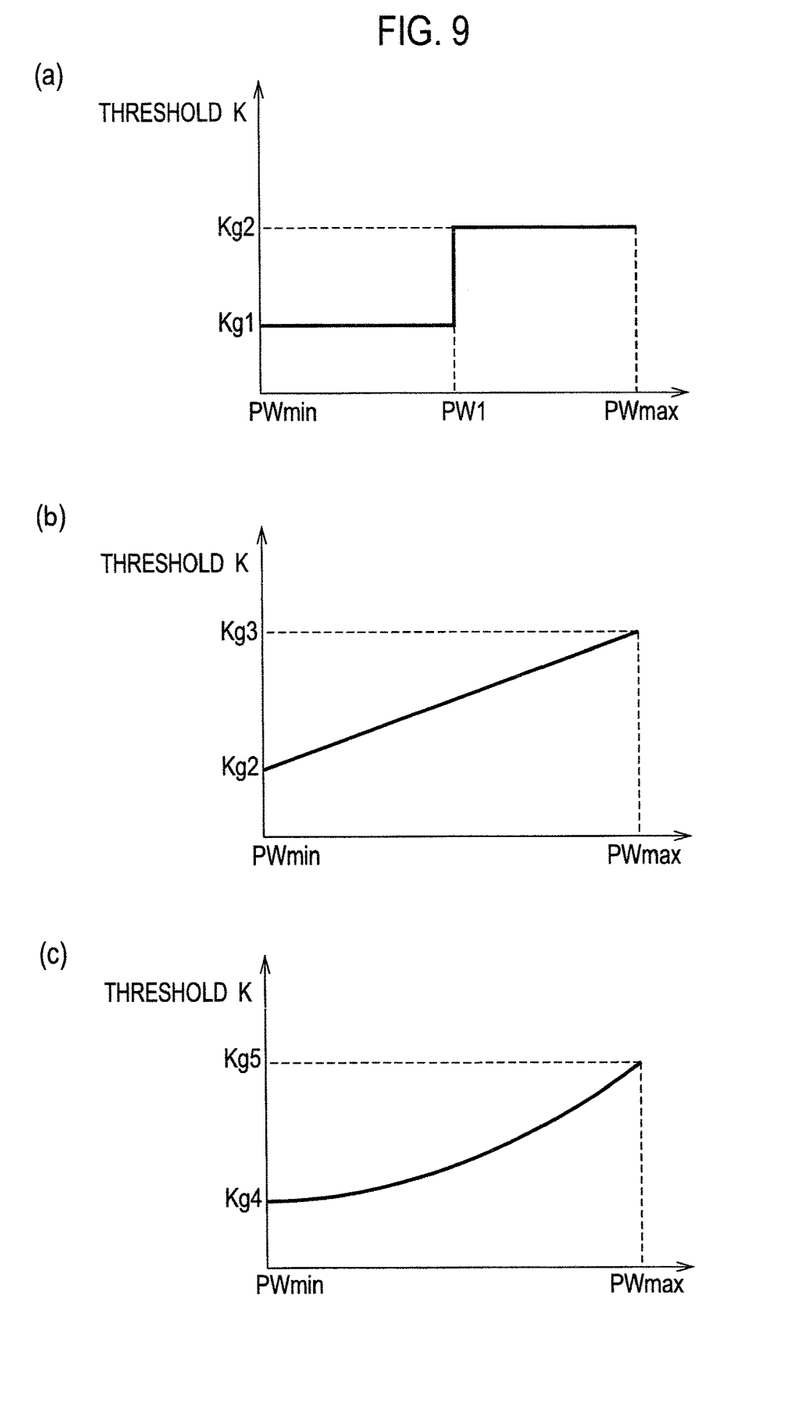
FIG. 9 is a diagram for explaining a relationship between a laser output and a threshold in an embodiment of a laser oscillation control method of the present invention.

Next, an exemplary relationship between the laser output value and the threshold to be set in correspondence to that value, that is applicable to the laser machining device 51 of the exemplary embodiment, will be shown in FIG. 9.

As shown on the horizontal axis of FIG. 9, the laser output value PW is made to be capable of taking an arbitrary value in a range from the minimum output PWmin to the maximum output PWmax. The level of the threshold is shown on the vertical axis.

First, there is an example (an exemplary division relationship) which divides the range that can be taken by the laser output value PW into n pieces (n=integer greater than or equal to 2) and controls such that a threshold according to each divided region is given. FIG. 9(a) shows that case of n=2 in this example, which is an exemplary control that gives a threshold Kg2 for PW1≤PW and a threshold Kg1 for PW<PW1, with the laser output value PW1 that becomes a point of division as a border. Also, FIG. 9(b) is an example in which K and PW are set in a linear relationship (K=aPW, a: positive constant) (an exemplary linear relationship), and this corresponds to the exemplary embodiment described above. Moreover, FIG. 9(c) is an example in which L and PW are set in a non-linear relationship (an exemplary non-linear relationship). It is free to combine them with each other. For example, it may be made such that the linear relationship or the non-linear relationship is applied to one region among those divided into n pieces.

The operation to deal with the case where the intensity or the amount of light of the returning light has exceeded the respective threshold is not to be limited to the alerting and the warning, and it is possible to set various types of operations freely. For example, it can be stopping the oscillation of the laser beam, raising the output of the laser beam to be oscillated, or decelerating the relative moving speed of the work W, and the like. This deceleration of the relative moving speed includes the case of stopping the work W with respect to the head unit 4 by setting the relative moving speed to be 0 (zero). As a more detailed example, the output of the laser beam is raised or the relative moving speed of the work W is decelerated in the case where it exceeds the alert threshold, and the oscillation of the laser beam is stopped in the case where it exceeds the warning threshold.

INDUSTRIAL UTILIZABILITY

According to the present invention, it is possible to obtain an effect that it is possible to prevent an occurrence of a defect caused by a returning light very well.

EXPLANATION OF REFERENCE NUMERALS 1 laser oscillator,
2 optical fiber,
2a core,
2b cladding,
2c covering layer,
2s wire,
3 connector unit,
3a casing,
4 head unit,
4a collimator lens,
4b condenser lens,
5 monitor unit,
5C CPU,
5M memory unit,
7 sensor,
8 cable,
51 laser machining device,
DP display unit,
H1, L1 intensities (of a reference level),
HM high output mode,
LM low output mode,
HK1 threshold (alert threshold),
HK2 threshold (warning threshold),
HK3, HK4, LK1, LK2, Nx, K, Kg1-Kg4 thresholds,
HS oscillation control unit,
LHS laser oscillation control device,
Ls laser beam,
NR input unit
P1-P8 waveforms,
PW, PWmin, PWmax, PW1 laser outputs,
Q, Q4, Q5 amounts of light,
SG control unit,
SN1 detection signal,
TB, TB8 unit division unit,
α1, α2, β1, β2 magnifications

The invention claimed is:
1. A laser machining device, comprising:
a laser oscillator for oscillating a laser beam to have a variable output according to a machining condition,
an optical fiber for propagating said laser beam,
a photoelectric sensor for detecting an intensity of light leaking from a cladding side face of said optical fiber and outputting a detection signal indicating said intensity, and a laser oscillation control device for controlling an operation of said laser machining device based on said detection signal, the laser oscillation control device comprising:
a control unit,
said photoelectric sensor, and
a monitor unit comprising a CPU and a memory, said monitor unit being configured to receive the detection signal outputted by the photoelectric sensor and to carry out signal exchanges with the control unit,
an output display and/or speech unit configured to output information from the control unit externally,
an input unit configured for a user to input information to the control unit,
wherein said CPU compares a first light value threshold that is set according to a laser beam output with said intensity or an amount of light obtained from said detection signal, when an output of said laser oscillator is less than or equal to a prescribed output, and
compares a second light value threshold that is set according to the laser beam output with an intensity or an amount of light obtained from said detection signal, when an output of said laser oscillator is greater than said prescribed output, and
generates a command signal to the laser oscillator to stop an oscillation of the laser beam at said laser oscillator to thereby prevent an occurrence of a defect of the optical fiber,
wherein the first and the second light value thresholds are each set based upon respective predetermined reference levels.

2. The laser machining device as recited in claim 1, wherein said laser oscillation control device stops the oscillation of said laser beam at said laser oscillator, when said intensity or said amount of light exceeds said first light value threshold in a first state, or when said intensity or said amount of light exceeds said second light value threshold in a second state.

3. The laser machining device as recited in claim 1, wherein said laser oscillation control device increases the output of said laser oscillator, or decelerates a relative moving speed of a work on which said laser beam is irradiated, when said intensity or said amount of light exceeds said first light value threshold in a first state, or when said intensity or said amount of light exceeds said second light value threshold in a second state.

4. The laser machining device as recited in claim 1, wherein said first light value threshold or said second light value threshold includes a plurality of thresholds with different sizes, and said laser oscillation control device compares each of said plurality of thresholds with said intensity or said amount of light, and carries out a different operation control for each of the comparison results.

5. The laser machining device as recited in claim 1, wherein controlling the operation of said laser machining device based on a result of said comparing prevents an occurrence of a defect caused by a returning light.

6. The laser machining device as recited in claim 1, wherein the first and the second light value thresholds are each a product of the respective predetermined reference levels and respective magnification values.

7. The laser machining device as recited in claim 6, wherein the respective predetermined reference levels indicate intensity levels of said light leaking from the cladding side face of said optical fiber based solely on direct light detected by said photoelectcric sensor, when there is no returning light.

8. A laser oscillation control method mounted on a fiber laser machining device, for controlling an operation of a laser oscillator capable of oscillating a laser beam to have a variable output according to a machining condition, the laser oscillation control method comprising:
detecting, by a sensor, an intensity of leakage light leaking from a cladding side face of an optical fiber through which said laser beam is propagating, and obtaining a detection signal indicating said intensity,
obtaining said intensity or an amount of light from said detection signal, and comparing said intensity or said amount of light obtained, with a light value threshold that is set in advance, and
controlling an operation of said laser oscillator according to a result of said comparing, by a laser oscillation control device that includes a CPU and a memory and further comprises the sensor, a control unit and a monitor unit, the monitor unit being configured to receive a detecting signal outputted by the sensor and to carry out signal exchanges with the control unit, the fiber laser machining device comprising an output display and/or speech unit configured to output information from the control unit externally, and an input unit configured for a user to input information to the control unit,
wherein said light value threshold is set to be a different value according to each of a plurality of outputs of said laser oscillator,
said comparing compares, by the CPU, said light value threshold according to a laser beam output that is being oscillated by said laser oscillator, with said intensity or said amount of light, and
said controlling stops a laser oscillation of said laser oscillator, increases the output of said laser beam oscillated by said laser oscillator, or decelerates a relative moving speed of a work on which said laser beam is irradiated, when said intensity or said amount of light exceeds a light value threshold, based on a result of said comparing,
wherein the light value threshold is set based upon a predetermined reference level.

9. The method of claim 8, wherein the controlling prevents an occurrence of a defect caused by a returning light.

10. The method of claim 8, wherein said light value threshold is a product of the predetermined reference level and a magnification value.

11. The method of claim 10, wherein the predetermined reference level indicates an intensity level of said leakage light leaking from the cladding side face of said optical fiber based solely on direct light detected by said photoelectric sensor, when there is no returning light.

12. A laser machining device, comprising:
a laser oscillator for oscillating a laser beam to have a variable output according to a machining condition;
an optical fiber for propagating said laser beam;
a sensor for detecting an intensity of light leaking from a cladding side face of said optical fiber and outputting a detection signal indicating said intensity; and
a laser oscillation control device for controlling an operation of said laser machining device based on said detection signal,
the laser oscillation control device comprising a CPU and a memory and further comprising:
a control unit,
said sensor, and a monitor unit configured to receive the detection signal outputted by the sensor and to carry out signal exchanges with the control unit, an output unit configured to output information from the control unit externally, an input unit configured for a user to input information to the control unit, wherein said CPU compares a first light value threshold that is set according to a laser beam output with said intensity or an amount of light obtained from said detection signal, when an output of said laser oscillator is less than or equal to a prescribed output, and compares a second light value threshold that is set according to the laser beam output with said intensity or an amount of light obtained from said detection signal, when an output of said laser oscillator is greater than said prescribed output, sets another light value threshold for said intensity, divides a waveform of said laser beam for each prescribed unit time, and obtains a number of divided portions that exceed said another light value threshold, and controls the operation of said laser machining device based on a result of said comparing and said number of divided portions.

13. The laser machining device as recited in claim 12, wherein the first and the second light value thresholds are each a product of respective predetermined reference levels and respective magnification values.

14. The method of claim 13, wherein each predetermined reference level indicates an intensity level of said leakage light leaking from the cladding side face of said optical fiber based solely on direct light detected by said sensor, when there is no returning light.

15. The method of claim 12, wherein the controlling prevents an occurrence of a defect caused by a returning light.

16. A laser oscillation control method mounted on a fiber laser machining device, for controlling an operation of a laser oscillator capable of oscillating a laser beam to have a variable output according to a machining condition, the laser oscillation control method comprising:

detecting, by a sensor, an intensity of leakage light leaking from a cladding side face of an optical fiber through which said laser beam is propagating and obtaining a detection signal indicating said intensity; and obtaining said intensity or an amount of light from said detection signal, and comparing said intensity or said amount of light obtained, with a light value threshold that is set in advance; and controlling an operation of said laser oscillator according to a result of said comparing, by a laser oscillation control device that includes a CPU and a memory and further comprises the sensor, a control unit and a monitor unit, the monitor unit being configured to receive the detecting signal outputted by the sensor and to carry out signal exchanges with the control unit, the fiber laser machining device comprising an output unit configured to output information from the control unit externally, and an input unit configured for a user to input information to the control unit, wherein said light value threshold is set to be a different value according to each of a plurality of outputs of said laser oscillator, said comparing, by the CPU, compares said light value threshold according to a laser beam output that is being oscillated by said laser oscillator, with said intensity or said amount of light, and said controlling stops a laser oscillation of said laser oscillator, increases the variable output of said laser beam oscillated by said laser oscillator, or decelerates a relative moving speed of a work on which said laser beam is irradiated, when said intensity or said amount of light exceeds said light value threshold based on a result of said comparing, setting another light value threshold for the intensity, dividing a waveform of said laser beam for each prescribed unit time, and obtaining a number of divided portions that exceed said another light value threshold; and controlling an operation of said fiber laser machining device based on a result of said comparing and said number of divided portions.

17. The laser machining device as recited in claim 16, wherein the light value threshold and a second light value threshold are each a product of respective predetermined reference levels and respective magnification values.

18. The method of claim 17, wherein the respective predetermined reference level indicates an intensity level of said leakage light leaking from the cladding side face of said optical fiber based solely on direct light detected by said sensor, when there is no returning light.

19. The method of claim 16, wherein the controlling prevents an occurrence of a defect caused by a returning light.

* * * * *